July 29, 1941.  C. C. BENNETT  2,250,742
CHASSIS ANALYZER
Filed May 21, 1934  6 Sheets-Sheet 1
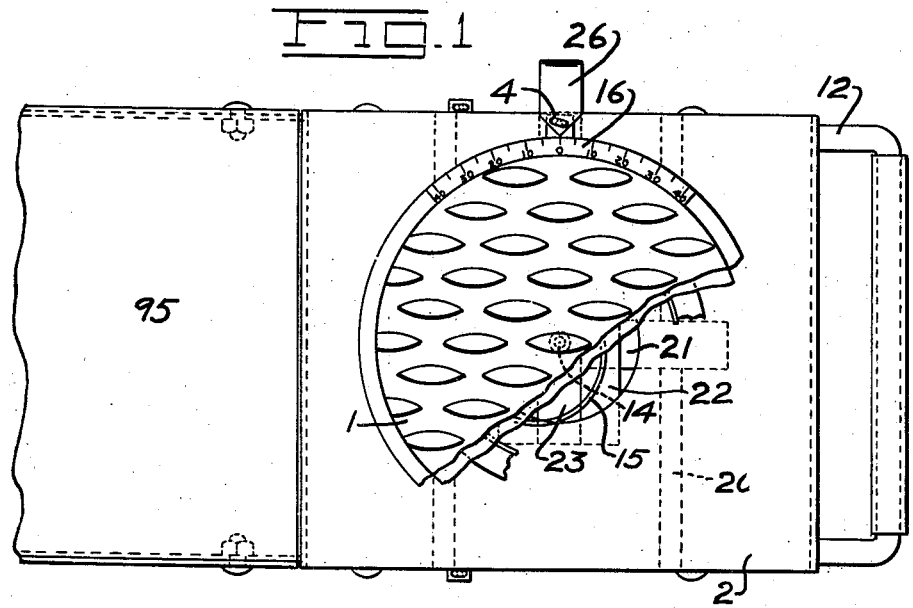
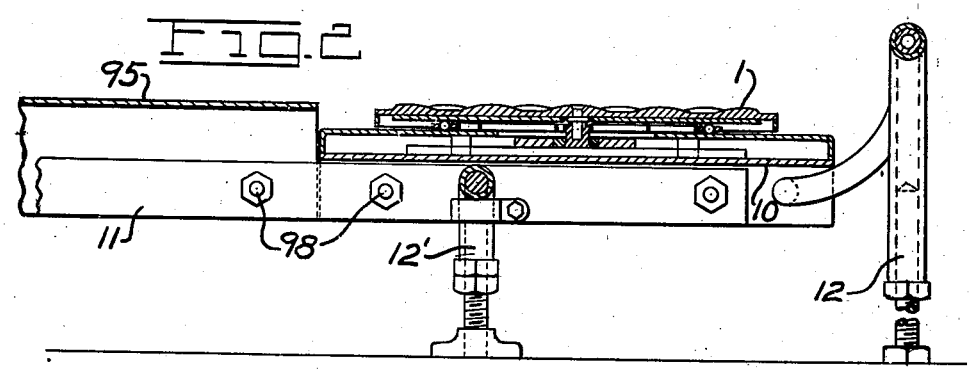
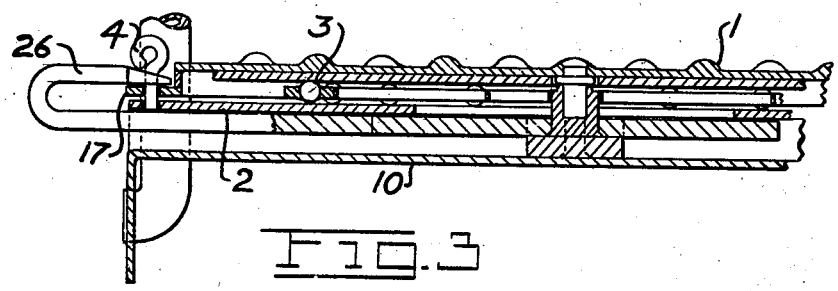
Inventor
Claude C. Bennett
By Charles L. Reynolds
Attorney

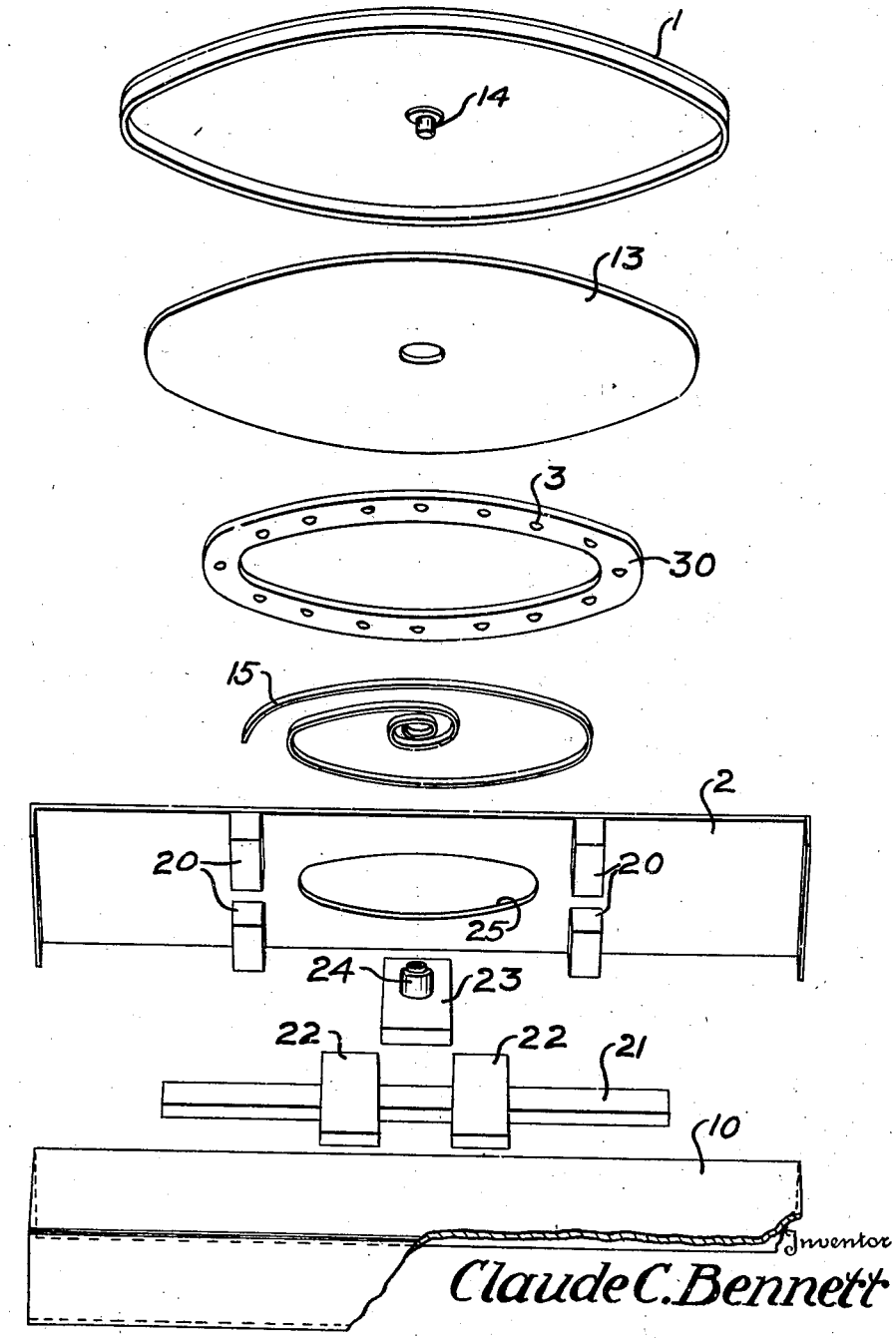

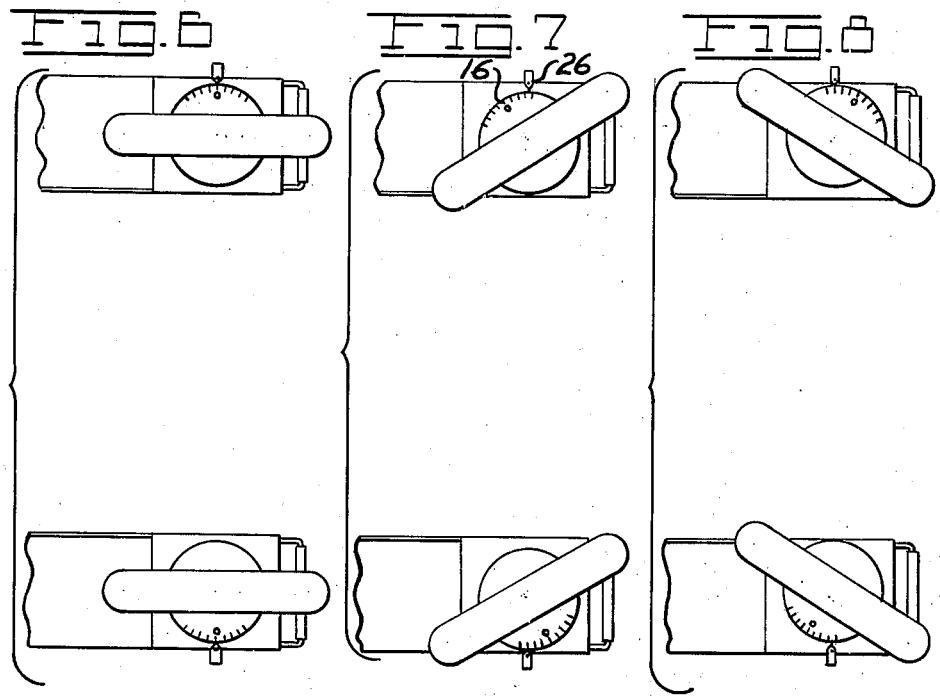
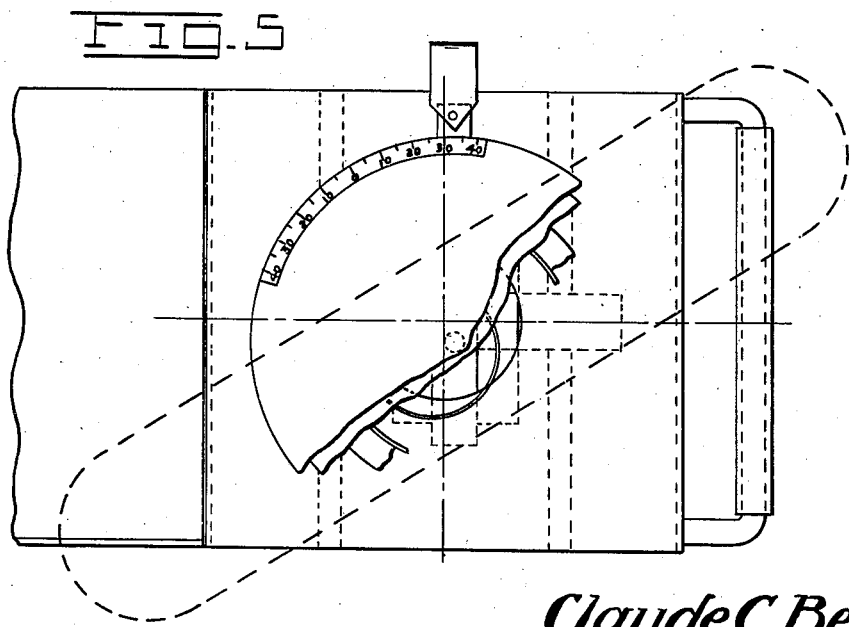

July 29, 1941.　　　C. C. BENNETT　　　2,250,742
CHASSIS ANALYZER
Filed May 21, 1934　　　6 Sheets-Sheet 4
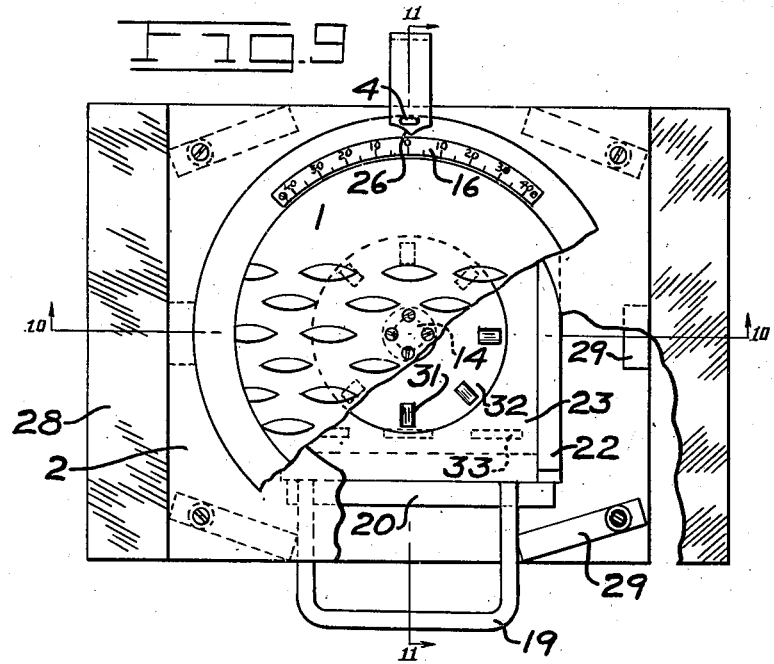
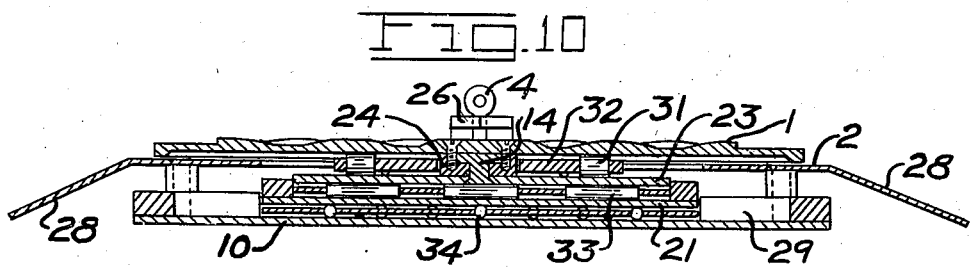
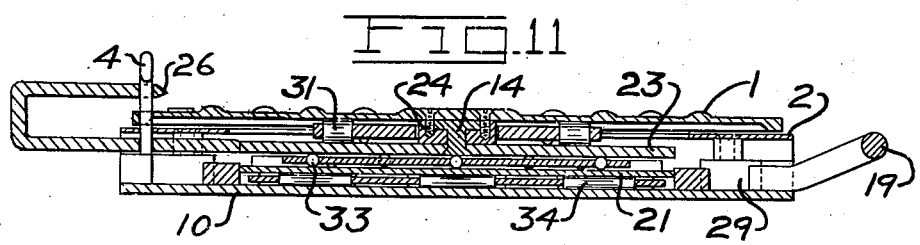
Inventor
Claude C. Bennett
By Charles L. Reynolds
Attorney July 29, 1941.  C. C. BENNETT  2,250,742
CHASSIS ANALYZER
Filed May 21, 1934  6 Sheets-Sheet 5
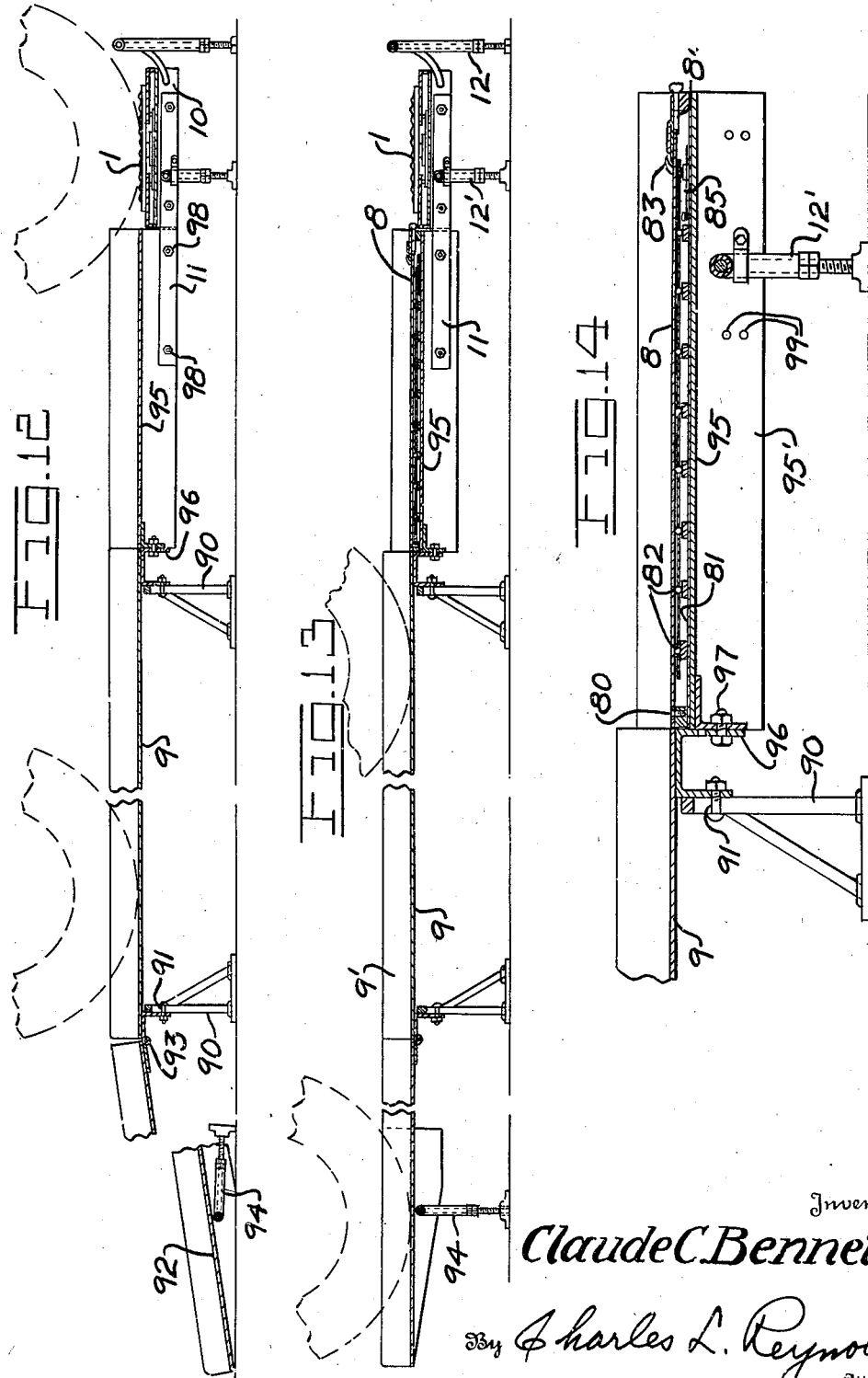
Inventor
Claude C. Bennett
By Charles L. Reynolds
Attorney July 29, 1941.  C. C. BENNETT  2,250,742
CHASSIS ANALYZER
Filed May 21, 1934  6 Sheets-Sheet 6
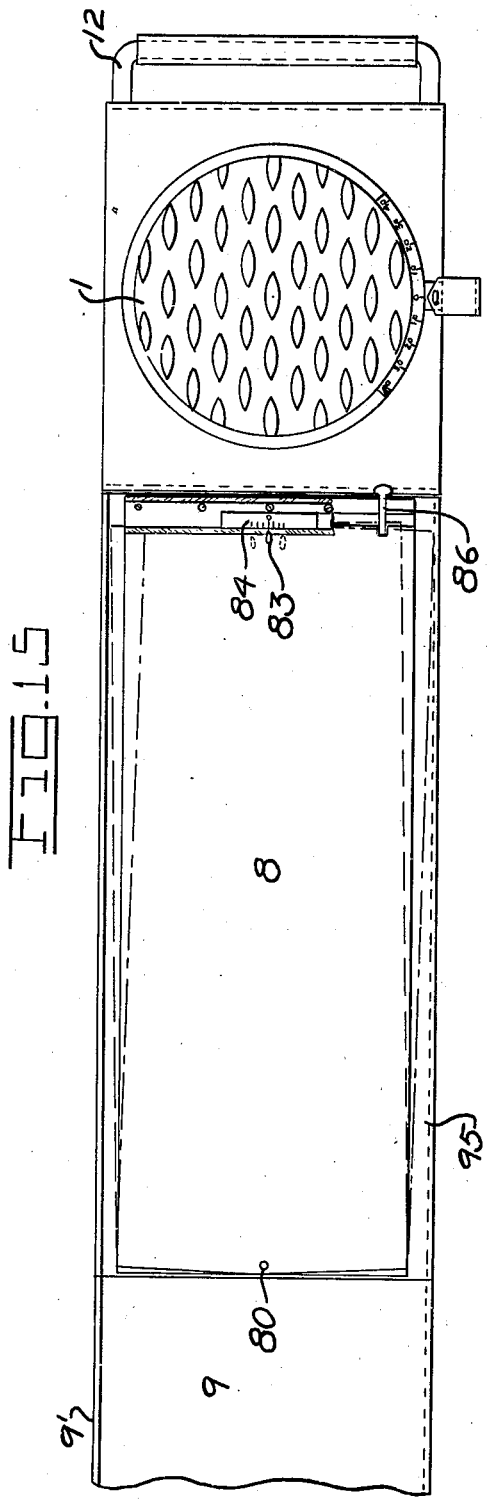
Inventor
Claude C. Bennett
By Charles L. Reynolds
Attorney Patented July 29, 1941

2,250,742

UNITED STATES PATENT OFFICE 2,250,742

CHASSIS ANALYZER

Claude C. Bennett, Seattle, Wash., assignor to A. E. Feragen, Inc., Seattle, Wash., a corporation of Washington Application May 21, 1934, Serial No. 726,713

11 Claims. (Cl. 33—203)

My invention relates to devices used in checking the alignment of the front or steering wheels of an automobile.

There are various devices for the straightening of frames, the correction of misalignment, and for accomplishing the checking of such work as it progresses, but in general these are large, heavy devices, require considerable room, and are not convenient for quickly checking the alignment to determine, in the presence of the car's owner, whether or not the alignment needs correction. Accordingly it is one of the principal objects of this invention to provide a device which will require but little room, and which can therefore be set up in the reception space of a service garage, and by the use of which the customer or owner of the car can be quickly convinced that his car is or is not in proper alignment, leaving to the heavier shop tools the job of accomplishing and checking the actual corrections.

Checking of misalignment necessitates determination of whether or not there is any side thrust, due to misaligned wheels, and a determination of the inaccuracies which cause such side thrust, which may be due to improper caster angle, improper camber of the wheels, or improper lateral inclination of the king pin. It may be due, of course, to other causes, but these are the principal causes, and it is therefore an object of my device to provide means whereby these several factors can be quickly and conveniently checked, to the end that the customer can be informed what operations are necessary, and, of course, the cost of such operations, for the cost will vary considerably depending upon whether or not the axle must be twisted or bent, or a new spindle body installed because of loose bushings or a bent spindle, and depending upon whether or not the axle must be removed for corrective measures.

In checking caster and king pin inclination angles it is customary to apply a gauge to the wheel, and to swing the wheel first 30° in one direction from the straight-ahead position, and then 30° in the opposite direction from the straight-ahead position. Because of the changes in relationship of the two front wheels, and because of the angular relationship of the two king pins, such movement will cause slight changes in the relative positions of the two wheels, one at each side, and if the wheel merely rests upon a solid unyielding support, as the floor, the resistance of the tire to change may cause an inaccurate reading to be given by the gauge. It has been found that the tires in thus swinging from one position to another move longitudinally of the car, and also transversely of the car, and while in my Patent No. 1,989,307, dated January 29, 1935, I disclosed a turntable which could be employed in such determinations, although not primarily intended therefor, such turntable did not have free universal movement in its own plane, and it is therefore an object of this invention to provide a turntable whereon the wheels may rest when swinging through the various positions indicated, by means of which each wheel may freely move with relation to the other wheel, and in such manner that the turntable has free universal movement within its own plane.

It is also an object to provide such a turntable wherein antifriction devices may be incorporated without increasing its thickness appreciably, and particularly to provide such a turntable wherein the antifriction supporting members may be rollers, to the end of obtaining the broadest possible lines of support, for it has been found that balls employed in such antifriction members have a tendency to wear a narrow groove or to cut the steel plates employed in the turntable, and to deform them.

It is also an object to provide a chassis analyzer for accomplishing the various checking operations which will be readily adaptable to the employment, in addition to the turntables, or without the use of such turntables, of a so-called weegee board or runner board for indicating side thrust of the wheels.

It is also an object to provide such a device wherein the ramp itself may be used as a part of the support for the car, to the end that the operations may be done with the car elevated at a convenient height above the floor, yet without undue exertion, and without requiring any excess floor space.

With these objects in mind, and with others as will appear hereafter, my invention comprises the novel devices and the combination and relative arrangement thereof, as shown in the accompanying drawings, and as will be described in this specification, and more particularly defined in the claims which terminate the same.

In the accompanying drawings I have shown my invention embodied in forms such as are now preferred by me.

Figure 1 is a plan view, with parts broken away, of the turntable end of the chassis analyzer. Figure 2 is a longitudinal section through the same, and Figure 3 is a transverse section, taken at right angles to Figure 2.

Figure 4 is an exploded view of one form of the turntable element.

Figure 5 is a view similar to Figure 1, showing the manner of use of the turntable.

Figures 6, 7 and 8 are diagrams illustrating the manner of use of the turntable.

Figure 9 is a view similar to Figure 1 of a turntable, in slightly modified form, particularly intended for floor use, and Figures 10 and 11 are sections through the same on the respective lines 10—10 and 11—11 of Figure 9.

Figure 12 is a longitudinal sectional view of the complete chassis analyzer, showing parts in position to receive a car, and Figure 13 is a similar view, showing the device differently arranged to accomplish certain of the checking operations.

Figure 14 is an enlarged longitudinal section of the runner board in association with the runway of the chasis analyzer.

Figure 15 is a plan view of the chassis analyzer, including the runner board and turntable.

Referring first to Figures 12 and 13, the chassis analyzer comprises a runway 9, suitably supported upon legs 90 and preferably adjustable somewhat in height, for leveling or for the convenience of the user, as indicated by the bolt and slot connection at 91. A ramp section 92 hinged at 93 to the entrance end of the runway 9 is inclined to receive a car, but may be supported on a level with the runway 9 by means of a collapsible leg 94, which is adjustable in height, so that the ramp section, when elevated, may be brought level with the runway 9 in whatever position the latter may be adjusted. At the end of the runway opposite the ramp section 92 is supported a runner board 8, which may be of a type now commonly used for checking misalignment of wheels through indication of side thrust, and beyond that is a turntable 9. The runner board 8 may be used or not, as the shop manager may prefer. It is omitted in Figure 12, and instead there is a section 95 which forms an extension of the runway 9, and which is secured to a depending flange 96 at the end of the runway proper by means of a bolt or bolts 97 (see Figure 14), which may be secured alternatively in one hole or another. Secured in the lower hole, the bolt will drop the section 95 to a level which will bring the runner board 8 supported thereon level with the runway proper 9. With the bolt 97 in the upper hole the section 95 will itself be level with the runway, as seen in Figure 12.

Similarly the turntable I is supported level with the runway, and to this end its support 10 is provided with an arm 11 which may be bolted to a flange 95' depending below the section 95. The bolts 98 which support this arm 11 may be secured in upper or lower holes 99, as may be required, depending upon whether the section 95 is elevated as seen in Figure 12, or dropped to the level where it is seen in Figure 13. Legs 12 and 12', adjustable in length, support the turntable above the floor. The leg 12 may be curved upwardly to form a bumper or chock to prevent the automobile overrunning the end of the device and dropping off to the floor, and guide flanges 9' are employed, as is customary, to keep the wheels from running off the sides of the runway. As I have indicated, the device may be used with the runner board 8 and the turntable I both in position level with the runway proper, or either one of the turntable or runner board may be eliminated, as desired.

As previously mentioned, the runner board 8 may be substantially of any suitable construction. In effect, it comprises the runner board proper, a steel plate of considerable length pivoted at 80 close to the end where the tire first contacts the runner board upon a support 81, which rests upon the runway section 95. Between the runner board and the supporting plate 81 are a series of antifriction balls or like members, indicated at 82. At the end of the board opposite the pivot 80 are a cooperating index and scale. The index finger 83 may be supported on the runner board to cooperate with a scale 84 supported from the supporting plate 81. A spring 85 may be employed to bring the runner board back to zero position, when not disturbed by side thrust, and for some occasions it will be desirable to provide a locking pin 86 engageable within a notch in the end of the runner board 8 (see Figure 15) to prevent the runner board from moving sideways, in order that the wheel may be guided properly to the center of the turntable I.

Referring now to Figures 1, 2, 3 and 4, which illustrate the turntable, it will be seen that there is a cover plate 2 employed which rests upon the base plate 10, and which is provided with spaced guides 20, in which is received a slide 21. This slide is thus constrained by the guide 20 to rectilinear movement, in this instance longitudinally of the runway. The slide in turn has spaced guide members 22 which receive a second slide 23, and thus the slide 23 has transverse movement in its guides 22. The combination of longitudinal movement and transverse movement gives the rotative bearing 24, carried by the second slide 23, universal movement in a horizontal plane, and to permit this movement the cover plate is provided with an aperture 25 through which the bearing 24 may project.

The turntable I is provided with a complemental rotative bearing member 14 which complementally engages the bearing 24, and when thus mounted the turntable may have universal movement in its own plane, longitudinally, transversely, and rotatively. For the better support of the turntable I provide antifriction bearing members, for instance, the balls 3 received in a retainer ring 30, which balls rest (in the form illustrated in Figures 1, 2 and 3) upon the top of the cover plate 2, and which bear on the under side of the turntable I or upon a wear plate 13 which is disposed above the balls and beneath the turntable. In order that the balls may follow the movement of the turntable, and yet not restrict or impede this movement, the ball retainer 30 may be connected to the turntable or to the bearing 24 by a spiral spring 15 secured to the bearing member 24 and to the ball retainer 30.

If the turntable were universally movable, but the operator had to gauge its rotative movement by an index fixed to its base plate 10 or to its cover plate 20, it could not be accurately told how far the turntable had rotated because of the slight transverse and lateral movement of the wheel effecting corresponding displacement of the turntable. It is therefore essential that index means be provided which will follow the turntable, however it may move. To this end I provide an extension 26 of one of the slides, that one which carries the bearing 24. The end of this extension 26 forms one index which cooperates with a scale 16 formed upon the edge of the turntable I. By this means the index 26 follows all transverse and longitudinal movement of the turntable, and the operator may read immediately the degree of rotation of the turntable, without regard to displacement thereof laterally or longitudinally. It is desired to point out, too, that different cars have different spacings between the steering wheels, and the transverse movement of the turntable permits each turntable to be so located that the wheel may be substantially centered thereon, so that the center of the area of contact of the tire with the turntable will substantially coincide with the axis about which the turntable rotates.

When positioning the car upon the turntable it is sometimes preferred that the turntable should not move laterally or longitudinally, and to prevent this I provide a removable pin 4 which passes through holes provided in the index 26 and in the cover plate 2, and this locks the slides to the cover plate, which in turn is secured to the base plate 10 as by welding or otherwise, and any movement of the turntable, except rotational movement, is thereby prevented. However, if it is desired to prevent rotative movement of the turntable also, the turntable or a flange 17 thereof may be provided with a hole through which the pin 4 may also pass, as may be seen in Figure 3.

The turntable shown in Figures 9, 10 and 11 is substantially the same as that shown in Figures 1, 2 and 3, the principal difference being that instead of the balls 3 forming the antifriction bearing members there is shown in Figures 9, 10 and 11 certain rollers as antifriction bearing members. Thus rollers 31 are supported in a plate 32 between the turntable 1 and the transverse slide 23, which is now widened in the form of a plate, and rollers 33 are similarly supported and positioned between the slide 23 and the longitudinal slide 21, which is similarly formed as a plate. The latter is supported upon rollers 34 between the slide 21 and the base plate 10. Suitable stops 29 secured to the base plate prevent movement of the slides beyond proper supporting positions.

This form of the turntable is particularly designed for floor use, and to this end the cover plate 2 is provided with approach inclines 28, and a handle 19 is secured to the base plate 19, by means of which the turntable may easily be picked up and moved around.

In using the device a car may be run up the ramp section 92 under its own power, after which the ramp section is elevated and the car is rolled back to support its rear wheels on the now elevated ramp. In this position its front wheels would be clear of the runner board 8. Now it can be rolled forward over the runner boards, and if any side thrust occurs, it will be indicated by lateral displacement of one or the other of the runner boards, or both, and the mechanic and the car's owner will at once know that the alignment is defective in some particular. Now it may be rolled forward off the runner board and onto the turntable. Thus resting, as seen in Figure 6, the wheels may be checked for camber angle in the straight-ahead position, and then swung first in one direction, to the position of Figure 7, and then in the other direction, to the position of Figure 8, to check, in turn, the caster angle and the lateral inclination angle of the king pin. The indices 26 and 16 always indicate accurately the extent of swing in all positions of the wheel. First having determined, then, that there is misalignment by the indication of the runner board, the mechanic is immediately in position, by running the car onto the turntable, to determine which of the three major factors usually causing misalignment is incorrect, and having determined this, he is in position to tell the car's owner, without delay, what operations are necessary to correct the misalignment, and the cost thereof. It may also be found convenient to employ gauge means to check the trueness of the frame, but these form no essential part of the present invention, and have not been shown.

What I claim as my invention is:

1. A device for use in wheel gauging operations, comprising a base plate, a cover plate secured upon and spaced above the base plate, rectilinear guide means secured to the cover plate, a slide received in said guide means, and disposed between the said plates, a rectilinear guide carried by said slide and extending transversely to the direction of movement of the slide, a second slide received in said second guide, and disposed between the plates, a rotative bearing carried by said second slide, a turntable disposed above the cover plate and rotatively engaged with the said bearing, the cover plate having an enlarged aperture for the protrusion of the bearing, whereby the turntable has universal movement in its own plane.

2. A device for use in wheel gauging operations, comprising a base plate, a cover plate secured upon and spaced above the base plate, rectilinear guide means secured to the cover plate, a slide received in said guide means, and disposed between the said plates, a rectilinear guide carried by said slide and extending transversely to the direction of movement of the slide, a second slide received in said second guide, and disposed between the plates, a rotative bearing carried by said second slide, a turntable disposed above the cover plate and rotatively engaged with the said bearing, the cover plate having an enlarged aperture for the protrusion of the bearing, whereby the turntable has universal movement in its own plane, and antifriction supporting means between the turntable and the cover plate.

3. A device for use in wheel gauging operations, comprising a base plate, a cover plate secured upon and spaced above the base plate, rectilinear guide means secured to the cover plate, a slide received in said guide means, and disposed between the said plates, a rectilinear guide carried by said slide and extending transversely to the direction of movement of the slide, a second slide received in said second guide, and disposed between the plates, a rotative bearing carried by said second slide, a turntable disposed above the cover plate and rotatively engaged with the said bearing, the cover plate having an enlarged aperture for the protrusion of the bearing, whereby the turntable has universal movement in its own plane, and roller bearing means disposed between the turntable and cover plate, between the second slide and its guide, and between the first slide and the base plate.

4. A device for use in wheel gauging operations, comprising a base plate, a cover plate secured upon and spaced above the base plate, rectilinear guide means secured to the cover plate, a slide received in said guide means, and disposed between the said plates, a rectilinear guide carried by said slide and extending transversely to the direction of movement of the slide, a second slide received in said second guide, and disposed between the plates, a rotative bearing carried by said second slide, a turntable disposed above the cover plate and rotatively engaged with the said bearing, the cover plate having an enlarged aperture for the protrusion of the bearing, whereby the turntable has universal movement in its own plane, the turntable bearing an index, and a coperating index carried by the second slide and disposed in all positions of the turntable, in operative relationship to the latter's index.

5. A device of the class described, comprising a base, a tread-plate mounted on said base, provided with a central pivot pin, a bar operatively connected with said pin, and slidably mounted in said base, to permit movement of the pin and tread-plate transversely of said base.

6. A device of the class described, comprising a base, a tread-plate mounted on said base, provided with a pivot-pin centrally thereof, a bar with which said pin is pivotally connected provided at its outer end with an indicator, a gauge on said tread-plate readable with said indicator, to determine the degree of rotation of said tread-plate, and a supporting member for said bar in which the bar is slidably movable.

7. An automobile wheel aligning device comprising a turntable support for a front wheel of an automobile, anti-friction bearings supporting and directly contacting said turntable, a fixed support for said antifriction bearings and directly contacting therewith, means guiding said turntable for rotation with respect to said fixed support, and means guiding said turntable for bodily lateral movement upon the antifriction bearings along said fixed support.

8. A radius turning gauge for vehicle wheels comprising, in combination, a base plate, a pair of members slidably mounted for movement with respect to said base plate and in directions angular to one another, a wheel supporting element guided by the upper of said pair of members for rotation with respect thereto, means for measuring the angle through which said element rotates with respect to said upper member, and bearings directly contacting said base plate freely supporting said element for slidable and rotatable movement with respect to the base plate, guided by said pair of members.

9. A device for use in wheel gauging operations comprising a turntable, a base, means guided from the base for movement transversely thereof, means guiding said turntable for rotation relative to said first means, antifriction devices interposed between and directly engaging the turntable and the base, and an apertured plate in the apertures of which said antifriction devices are received to maintain them spaced apart and distributed beneath the turntable.

10. A device for use in wheel gauging operations comprising, in combination, a turntable, a base, means guided from the base for movement transversely thereof, means guiding said turntable for rotation relative to said first means, bearings interposed between and directly engaging the turntable and the base, and spring means operating to center said bearings beneath the turntable and tending to restore the bearings and turntable to their original positions after displacement therefrom.

11. A radius turning gauge for vehicle wheels comprising, in combination, a base element, a turn-table element, anti-friction bearings interposed between and directly engaging the turntable element and the base element supporting the turn-table element for rotatable and bodily lateral movement upon said base, a bearing cage interposed between said elements positioning said bearings, a pin carried by one of said elements coupled with said bearing cage, one of said elements being dish shaped toward the other element forming a housing enclosing said bearings and bearing cage, and means for indicating the amount of rotatable movement of said turn-table.

CLAUDE C. BENNETT.